United States Patent
Waibel et al.

(10) Patent No.: US 12,517,247 B2
(45) Date of Patent: Jan. 6, 2026

(54) SYSTEM HAVING A SENSOR AND ASSOCIATED METHOD

(71) Applicant: SICK AG, Waldkirch (DE)

(72) Inventors: Holger Waibel, Waldkirch (DE); Florian Simic, Waldkirch (DE); Carsten Natzkowski, Waldkirch (DE)

(73) Assignee: SICK AG, Waldkirch (DE)

( * ) Notice: Subject to any disclaimer, the term of this patent is extended or adjusted under 35 U.S.C. 154(b) by 90 days.

(21) Appl. No.: 18/517,670

(22) Filed: Nov. 22, 2023

(65) Prior Publication Data

US 2024/0176019 A1  May 30, 2024

(30) Foreign Application Priority Data

Nov. 25, 2022 (DE) .......................... 102022131242.9

(51) Int. Cl.
*G01S 7/04* (2006.01)
*B60T 10/00* (2006.01)
*G01S 17/04* (2020.01)

(52) U.S. Cl.
CPC .............. *G01S 17/04* (2020.01); *B60T 10/00* (2013.01)

(58) Field of Classification Search
CPC ................................ G01S 17/04; G01S 17/88
See application file for complete search history.

(56) References Cited

U.S. PATENT DOCUMENTS

| | | | |
|---|---|---|---|
| 11,154,442 B1 * | 10/2021 | Dean ...................... | A61G 5/045 |
| 2013/0037252 A1 * | 2/2013 | Major ................ | B60H 1/00742 |
| | | | 165/237 |

(Continued)

FOREIGN PATENT DOCUMENTS

| | | |
|---|---|---|
| DE | 102009034848 A1 | 2/2011 |
| DE | 102022106434 A1 | 9/2022 |

(Continued)

OTHER PUBLICATIONS

Wikipedia., "Lidar". https://de.wikipedia.org/w/index.php?title=Lidar&oldid=222950572.

*Primary Examiner* — Long T Tran
(74) *Attorney, Agent, or Firm* — Nath, Goldberg & Meyer; Jerald L. Meyer

(57) ABSTRACT

A method and a system having a sensor for detecting legs of a person in a monitored zone having protected fields and for releasing a function of a vehicle, having a control and evaluation unit for evaluating the protected fields, wherein the sensor is configured to generate at least two protected fields, wherein a first protected field detects at least a part of a first leg of the person, wherein a second protected field detects at least a part of a second leg of the person, the control and evaluation unit is configured to determine whether at least a part of a first leg of the person was detected in the first protected field and at least a part of a second leg of the person was detected in the second protected field, and to transmit at least a release signal to the vehicle and thus to release the function when at least a part of a first leg of the person was detected in the first protected field and at least a part of a second leg of the person was detected in the second protected field, wherein the sensor is a time of flight sensor wherein at least one light transmitter transmits a light signal and at least one light receiver receives a signal reflected or remitted by the person, and the control and evaluation unit is configured to evaluate the received signal on the basis of the time of flight and to form object determination signals.

27 Claims, 9 Drawing Sheets

(56) References Cited

U.S. PATENT DOCUMENTS

Figure 1A:
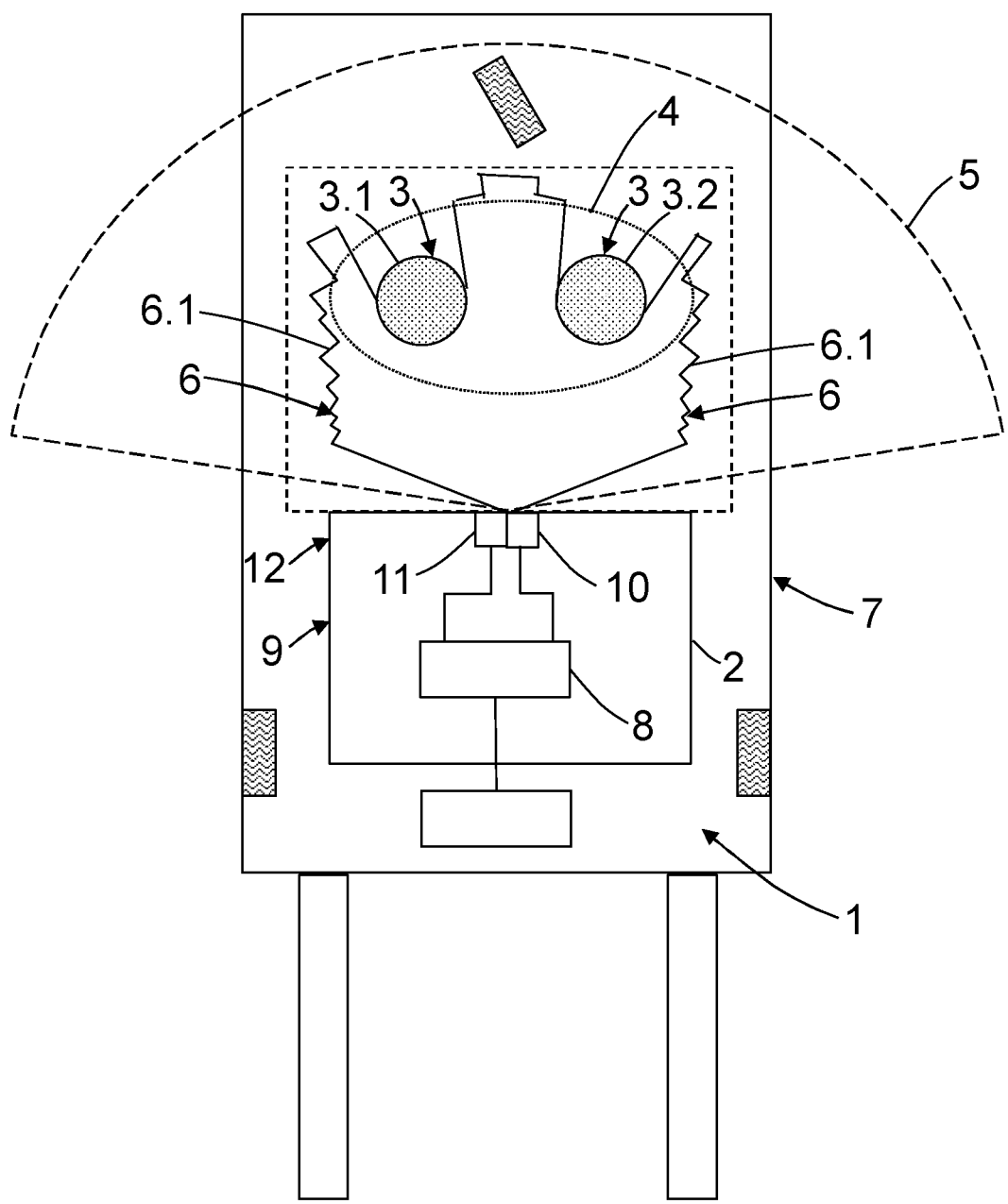

| | | | | |
|---|---|---|---|---|
| 2013/0177205 A1* | 7/2013 | Kasaoki | ................. | G06V 40/25 |
| | | | | 382/103 |
| 2015/0025751 A1* | 1/2015 | Sugiura | ................... | B60J 5/101 |
| | | | | 701/49 |
| 2016/0214556 A1* | 7/2016 | McGoldrick | ..... | B60R 21/01516 |
| 2018/0283080 A1* | 10/2018 | Tamura | ................ | B60R 25/209 |
| 2019/0162822 A1* | 5/2019 | Rafrafi | ................... | E05F 15/76 |
| 2021/0261392 A1* | 8/2021 | Theos | ................... | G05D 1/224 |

FOREIGN PATENT DOCUMENTS

| | | | |
|---|---|---|---|
| EP | 2679431 | A1 | 1/2014 |
| EP | 3647105 | A1 | 5/2020 |

\* cited by examiner

SYSTEM HAVING A SENSOR AND ASSOCIATED METHOD

The present invention relates to a system having a sensor for detecting legs of a person in a monitored zone having protected and to a method of detecting legs of a person in a monitored zone by a sensor having protected.

EP 2679431 A1 discloses an operator presence detector for releasing a function of a vehicle, having at least three zones, with each zone being configured to detect at least a part of a foot of an operator, a sensor arrangement that is associated with the zones and that is configured to detect the presence of at least a part of a foot in each of the zones and to generate foot presence signals corresponding to the zones in which at least a part of a foot has been detected, and a logic device that receives the foot presence signals from the sensor arrangement and transmits a signal to the vehicle, wherein, based on the foot presence signals, the logic device is programmed to determine whether feet of the operator are present in at least two of the zones in a predetermined configuration and to transmit a release signal to the vehicle and thus to release the function when feet of the operator are present in the zones in a predetermined configuration.

EP 3647105 A1 discloses an industrial vehicle having an operator compartment and an operator presence detector, wherein the operator presence detector comprises a first detector, arranged close to a side of the floor and at a distance above the floor, wherein a first detection field associated with the first detector extends between the one side of the floor and the side opposite the one side of the floor, and a second detector, arranged either close to the one side of the floor or close to the side opposite the one side of the floor and at a distance above the floor, wherein a second detection field associated with the second detector extends between the one side of the floor and the side opposite the one side of the floor, wherein the first detector and the second detector are configured and positioned such that an operator who has both a left lower extremity and a right lower extremity arranged in the operator compartment cannot cause by a single lower extremity that both the first detector and the second detector detect an object.

An object of the invention comprises providing an improved system and an improved method for detecting legs of a person in a monitored zone having protected fields.

The object is satisfied by a system having a sensor for detecting legs of a person in a monitored zone having at least one protected field and for releasing a function of a vehicle, having a control and evaluation unit for evaluating the protected field, wherein the sensor is configured to generate at least one protected field, wherein a first protected field detects at least a part of a first leg of the person, wherein the first protected field detects at least a part of a second leg of the person, the control and evaluation unit is programmed to determine whether at least a part of a first leg of the person was detected in the first protected field and at least a part of a second leg of the person was detected in the first protected field, and to transmit at least a release signal to the vehicle and thus to release the function when at least a part of a first leg of the person was detected in the first protected field and at least a part of a second leg of the person was detected in the first protected field, wherein the sensor is a time of flight sensor, wherein at least one light transmitter transmits a light signal and at least one light receiver receives a signal reflected or remitted by the person, and the control and evaluation unit is configured to evaluate the received signal on the basis of the time of flight and to form object determination signals.

The object is further satisfied by a system having a sensor for detecting legs of a person in a monitored zone having protected fields and for releasing a function of a vehicle, having a control and evaluation unit for evaluating the protected fields, wherein the sensor is configured to generate at least two protected fields, wherein a first protected field detects at least a part of a first leg of the person, wherein a second protected field detects at least a part of a second leg of the person, the control and evaluation unit is configured to determine whether at least a part of a first leg of the person was detected in the first protected field and at least a part of a second leg of the person was detected in the second protected field, and to transmit at least a release signal to the vehicle and thus to release the function when at least a part of a first leg of the person was detected in the first protected field and at least a part of a second leg of the person was detected in the second protected field, wherein the sensor is a time of flight sensor, wherein at least one light transmitter transmits a light signal and at least one light receiver receives a signal reflected or remitted by the person, and the control and evaluation unit is configured to evaluate the received signal on the basis of the time of flight and to form object determination signals.

The object is further satisfied by a method of detecting legs of a person in a monitored zone having a sensor having at least one protected field and of releasing a function of a vehicle, having a control and evaluation unit for evaluating the protected field, wherein the sensor is configured to generate at least one protected field, wherein a first protected field detects at least a part of a first leg of the person, wherein the first protected field detects at least a part of a second leg of the person, the control and evaluation unit is configured to determine whether at least a part of a first leg of the person was detected in the first protected field and at least a part of a second leg of the person was detected in the first protected field, and to transmit at least a release signal to the vehicle and thus to release the function when at least a part of a first leg of the person was detected in the first protected field and at least a part of a second leg of the person was detected in the first protected field, wherein the sensor is a time of flight sensor, wherein at least one light transmitter transmits a light signal and at least one light receiver receives a signal reflected or remitted by the person and the control and evaluation unit is configured to evaluate the received signal on the basis of the time of flight and to form object determination signals.

The object is further satisfied by a method of detecting legs of a person in a monitored zone having a sensor having protected fields and of releasing a function of a vehicle, having a control and evaluation unit for evaluating the protected fields, wherein the sensor is configured to generate at least two protected fields, wherein a first protected field detects at least a part of a first leg of the person, a second protected field detects at least a part of a second leg of the person, the control and evaluation unit is programmed to determine whether at least a part of a first leg of the person was detected in the first protected field and at least a part of a second leg of the person was detected in the second protected field, and to transmit at least a release signal to the vehicle and thus to release the function when at least a part of a first leg of the person was detected in the first protected field and at least a part of a second leg of the person was detected in the second protected field, wherein the sensor is a time of flight sensor, wherein at least one light transmitter transmits a light signal and at least one light receiver receives a signal reflected or remitted by the person and the control and evaluation unit is configured to evaluate the received signal on the basis of the time of flight and to form object determination signals.

The invention enables a scanning of the legs of the person by the time of flight sensor. A distance measurement with respect to the legs thus takes place. Unlike an interruption of a light barrier, a better and more accurate recognition of the legs can take place. The location or position of the legs can additionally be determined via the distance measurement.

A detection of the human leg can also be or comprise a detection of the foot or of a shoe. A detection of the leg can furthermore also be or comprise a detection of the leg covering.

The protected field or the protected fields are here preferably aligned horizontally so that the leg is detected in cross-section. However, the protected field or fields can also be inclined so that a cross-section of the legs will always still be detected.

A further advantage of a time of flight sensor as a scanning sensor in comparison with a transmitter/receiver system or a transceiver/reflector system is that the time of flight sensor measures distances. I.e. the detection of the legs becomes safer since the sensor measures where the detection is along the beam direction.

The first protected field, for example, detects the right leg of the person and the second protected field detects the left leg of the person. However, the converse case can also be provided according to which the first protected field detects the left leg of the person and the second protected field detects the right leg of the person.

In accordance with the invention, it is measured by the sensor and it is evaluated by the control and evaluation unit whether a sufficiently wide object is present in the first protected field and in the second protected field respectively. The first protected field and the second protected field are so close to one another, for example, that a leg can also be detected simultaneously in both protected fields. However, it is also simultaneously recognized that it is actually only a single leg that is detected in both protected fields respectively.

The first protected field and the second protected field are preferably arranged disjunctively so that they do not have any overlap. Provision can, however, also be made that the first protected field and the second protected field are arranged in an overlapping manner.

Provision can thus also be made on an overlapping arrangement that a single leg is detected by the first and second protected fields.

The first protected field and the second protected field are dimensioned as so large that at least one of the protected fields detects a leg when the leg is on the floor of the operator's cab. This means that there are no all too large margins to side walls to a front wall, or to a rear wall of the operator's cab. The protected fields admittedly have a distance from the front, rear, and/or side walls of the operator's cab, for example, but the distance from the adjacent walls is small enough that the leg is also at the margin of the operator's cab and is thus still detected.

In accordance with the invention, the person can move better in the operator's cab without a detection of the person being degraded. There is higher availability, unlike with conventional light barriers or conventional pressure mats with which the person, for example, also still has to establish floor contact by the feet, that is the legs can also not be raised at times.

A more reliable detection of the legs can take place by the use of protected fields instead of individual light beams.

The protected field are defined such that there is a zone in which the worker can be and each leg only respectively actuates or interrupts the first protected field or the second protected field.

The protected field or protected fields can, for example, have any desired shapes or can be configured with any desired shapes. For example, parts of the protected fields can have straight, curved, circular, and/or elliptical shapes. The form of the protected fields is only limited by the angular and distance resolution of the sensor. A further limitation takes place by shadow formation. The sensor cannot measure behind an object. For this purpose, however, a second sensor can optionally also be provided to avoid such shadows.

The vehicle can, for example, be a manual, semi-autonomous, or also autonomous vehicle. The vehicle can in particular be a vehicle that enables a manual, semi-autonomous, or autonomous mode of operation. The vehicle can, for example, be a forklift truck, an industrial truck, or similar.

In a further development of the invention, a front, rear, and/or side wall of the protected fields is also covered by the protected fields, with the front, rear, and/or side walls serving as a reference contour.

The front, rear, and/or side walls are thus equally constantly detected and can thus serve as a reference measurement for validation of even for the technical safety reference measurement so that the protected fields are cyclically testable. The contour of the front, rear, and/or side walls serve as the reference contour here.

In a further development of the invention, the sensor is integrated in a front, rear, or side wall so that the sensor does not project out of the wall.

The footwell of the operator's cab is thereby not impaired by the sensor. The sensor here preferably has a sufficient distance from the floor of the operator's cab so that preferably only the leg is detected and not the feet with the shoes. The distance of the protected fields from the floor is preferably between 30 mm and 300 mm.

The value of 30 mm is sensible due to the fanning out of the beams in the vertical direction. The value of a maximum of 300 mm is sensible since persons lying on the floor can thus also be detected. For example, if the person had become unconscious. The assumption applies here that the person has enough space to lie down completely The sensor is preferably integrated at a front inner side. The legs of the person are thereby detected from the front.

The sensor can, for example, also be installed or arranged so low that the sensor can safely detect the shoes, that is the feet, of the person. A greater minimal diameter (or length and width of the lower extremity) can then also be assumed.

This is advantageous since then a greater distance can be left from the rear wall by the protected field. The object to be detected is also larger. The distance between the first protected field and the second protected field can also be larger.

In a further development of the invention, a plurality of light transmitters and a plurality of light receivers are arranged, with the light transmitters and the light receivers being arranged in a common housing, with the light beams being transmitted by the light transmitters in fan shape in different angular directions and being received by the light receivers, with a partial protected field in the shape of a segment of a circle being formed by the light beams of a light transmitter and a reception field of view of the light receiver, with the partial protected fields of neighboring reception elements being adjacent to one another or overlapping and a plurality of partial protected fields forming a protected field.

In accordance with the further development, the sensor manages without mechanically movable parts. No rotating mirror or oscillating mirror is required. The sensor is thereby more robust with respect to oscillation/shock strains. The sensor without any mechanically movable arts is furthermore less expensive and has a higher service life.

The measurement of the width of the leg takes place such that the control and evaluation unit counts how many neighboring partial protected fields or partial beams have been interrupted.

In an alternative further development of the invention, the sensor has a scanning unit that is rotatable about an axis of rotation and that has at least one scanning module for the scanning of the monitored zone in the course of the rotation of the scanning unit about the axis of rotation and for the generation of corresponding received signals and that has the control and evaluation unit for the acquisition of information on the objects from the received signals, with the scanning module comprising at least the light transmitter for the transmission of a light beam or of a plurality of mutually separate light beams, and that has at least the light receiver for the generation of the received signals from the light beams remitted by the objects.

In accordance with the alternative further development, only a single light transmitter and only a single light receiver are required to generate the planar fields zones since the light transmitter and the light receiver continuously detect the environment at different angles via the rotatable scanning unit.

In a further development of the invention, the protected field forms at least one segment of a circle of at least 5°, at least 10°, or at least 20°. At least one planar segment of a circle is thereby always formed as a protected field. Protected fields in the shape of a circle segment can be particularly easily evaluated by the control and evaluation unit.

In a further development of the invention, the first protected field and the second protected field are arranged in a common plane.

The protected fields can thereby be particularly simply formed by a single sensor. Furthermore, both legs are scanned at an equally high distance here. In this respect, the same size of the legs can be assumed.

In a further development of the invention, a third protected field is arranged between the first protected field and the second protected field.

The third protected field is thus located at the center between the first protected field and the second protected field. The third protected field is here preferably arranged in a common plane with the first and second protected fields. The third protected field is preferably as wide as the spacing between the first protected field and the second protected field. The protected fields can here be arranged spaced apart or can also have overlap zones.

Provision is made here that a respective leg of a person is detected in the first and second protected fields and no object or leg is detected in the third protected field. The person is then legitimately in the operator's cab and a release signal is generated by the control and evaluation unit and is transmitted to the vehicle or to the vehicle controller.

If a leg is detected in the third protected field, no release signal is generated by the control and evaluation unit and a movement of the vehicle is prevented.

In a further development of the invention, a further protected field is arranged next to the first protected field.

The sensor here is, for example, not installed centrally in a side wall, namely, for example, installed in the direction of the entrance of the operator's cab. The further protected field can here register an entry or alighting of the person as a virtual door. The further protected field is not actuated or is free if the person is in the intended position in the operator's cab.

If the first protected field is interrupted or actuated by the person and if the further protected field is not interrupted or actuated by the person, the person is legitimately in the operator's cab. A manual operation of the vehicle can thereupon be released, for example. If the further protected field is interrupted, the person is no longer legitimately in the operator's cab. An emergency operation is thereupon initiated, for example. If neither the first nor the further protected field is interrupted or actuated, an automatic operation of the vehicle can be released, for example.

In a further development of the invention, a further protected field is arranged next to the first protected field or next to the second protected field, with the further protected field not being arranged between the first protected field and the second protected field.

The sensor here is, for example, not installed centrally in a side wall, namely, for example, installed in the direction of the entrance of the operator's cab. The further protected field can here register an entry or alighting of the person as a virtual door. The further protected field is not actuated or is free if the person is in the intended position in the operator's cab.

In a further development of the invention, the margins of the protected fields have a distance from a wall of an operator's cab, with the distance being smaller than 50 mm.

This means that there are no all too large margins to side walls to a front wall, or to a rear wall of the operator's cab. The protected fields admittedly have a distance from the front, rear, and/or side walls of the operator's cab, for example, but the distance from the adjacent walls is small enough that the leg is also at the margin of the operator's cab and is thus still detected.

In a further development of the invention, the distance from the first protected field and the second protected field is smaller than 50 mm.

In accordance with the further development, the first protected field and the second protected field are spaced apart so far that only a respective one of the protected fields can be interrupted by a single leg. Two legs are thus effectively recognized when a respective one leg is detected in a respective protected field.

In a further development of the invention, the control and evaluation unit is configured to measure a permitted width of the leg in the first protected field and in the second protected field.

It is, for example, possible by the evaluation of the protected fields to determine the width of the objects in the protected field and to thereby detect the width of the leg or of the lower leg below the knee. If the detected width of the object corresponds to an average width of a leg, it can be assumed that a leg was detected. Permitted minimal values and permitted maximum values are expediently defined here.

In a further development of the invention, a leg position or a leg movement is detected in at least one protected field and a braking procedure of the vehicle is controllable by the control and evaluation unit starting from the leg position or leg movement.

A braking procedure can thereby be controlled in dependence on the detected distance from a leg. A virtual brake pedal is thus formed. The closer the leg is therefore moved to the front in the direction of the sensor, for example, the greater the braking. If the leg is moved further to the rear, away from the sensor, the brake is released again. The contactless brake can be implemented by means of the first protected field or by means of the second protected field. However, different directions can also be provided for the actuation of the brake with respect to the sensor, that is also directions transversely or obliquely to the sensor.

The brake can naturally also be a parking brake. I.e. the person can activate or deactivate the parking brake by the suitable movement of the foot, optionally under the condition that the vehicle is currently not traveling faster than a maximum speed.

The person must, for example, also dwell in a certain position for a certain time so that this special function of the parking brake is triggered, e.g. by the foot close to the sensor head. It is thus ensured that the person does not accidentally switch the parking brake on/off.

A mechanical brake, a mechanical brake pedal, or also a push button in the floor of the operator's cab that was often attached on the floor at the center or at the margin of the operator's cab can thus advantageously be omitted, for example. Alternatively, the mechanical brake pedal could be maintained, but could be supplemented by a more comfortable and more flexible solution with the contactless virtual brake pedal.

The distance or the angle, or a combination of both, could be evaluated in the protected field to control the braking procedure. The brake can, for example, also be controlled by a lateral movement of the leg.

The braking procedure can in particular be controlled by a lateral leg movement in the direction of the third protected field.

A detection of the leg in the third protected field can here, for example, trigger a more powerful braking or a full braking or an emergency stop.

For this purpose, for example, further protected fields or braking fields can also be defined to provide a more comfortable braking function.

These protected fields can be used to brake the vehicle, optionally with an evaluation, that brakes more and more the closer the leg approaches the third protected field or with the greatest braking when the leg is detected in the third protected field.

In a further development of the invention, the sensor transmits a plurality of different signals to the vehicle.

The sensor outputs a plurality of signals so that the vehicle can distinguish different cases, for example a single activation signal as a 1 of N signal or, for example, via a digital bus, for each operating mode. Alternatively, the logic can also be implemented in the vehicle controller and the sensor only delivers the statuses of the protected fields and, for example, whether a fault is present, separately where possible.

The vehicle formed by a vehicle controller can have different operating modes.

A manual normal operation is, for example, provided as an operating mode of the vehicle or of the vehicle control. All the functions of the vehicle are switched free here. The person controls the vehicle.

An emergency operation is furthermore provided as an operating mode of the vehicle, for example. The vehicle switches into this operating mode when a fault has occurred.

An automatic mode and a semi-automatic mode can furthermore be provided as an operating mode of the vehicle.

The vehicle switches into the operating mode when a fault has occurred. The conditions for a manual normal operation, an automatic operating mode, or a semi-automatic mode are, for example, not met if only one leg of the person was detected.

The switch into the operating mode of emergency operation represents a protective measure. The functional extent of the industrial truck is restricted in this mode. Fully automatic functions are switched off or a switch to "manual" operation is made.

It is required by standards, for example, that an emergency stop is carried out when the vehicle is in automatic operation and a person is detected in the operator's cab. It is also conceivable that a full braking, that is an emergency stop, is not necessarily immediately carried out. It is optionally also sufficient to brake slowly until the vehicle has fallen below a certain max. speed.

The partially automatic operation or semi-automatic operation as an operating mode has the following properties:

A person is not completely in the operator's cab of the vehicle. This is also called a "hold to run" function. For example, the person or the picker runs next to the vehicle or industrial truck and operates the industrial truck, for example, only at a central control module. The functional extent of the industrial truck is restricted in this mode. The industrial truck can only drive slowly, for example.

The automatic mode as an operating mode 'has the following properties:

It may be permitted in the automatic mode that there is no person in the operator's cab. The vehicle, for example, a forklift, moves autonomously, that is without it being controlled by the person. No person may be in the operator's cab of the vehicle in this mode. It is the object of the sensor to ensure that there is no person in the operator's cab of the vehicle. Such a check is proposed in the non-harmonized industrial truck standard (ISO 3691-4). Standard requirement No. 23 requires a safety level of PL c.

It may also be permitted in the automatic mode that there is a person in the operator's cab. It is ensured by means of the sensor that both legs or both lower legs of the person are within the operator's cab. It must be ensured that a safety function is initiated as soon as the person is no longer legitimately on the operator's platform. For example, because the person has become unconscious. Standard requirement No. 25 recommends safety level PL d here.

The person on the vehicle or industrial truck does not control the vehicle himself here. The person so-to-say drives along without controlling himself. The vehicle or the industrial truck works and drives autonomously.

A change between the operating modes can be as follows:

The vehicle is in a manual normal mode, for example. There is a person in the operator's cab of the vehicle. It is sufficient here if a respective leg of the person is detected in the first protected field or in the second protected field. It is therefore sufficient if only a single leg is effectively detected. A single protected field would thus also be sufficient for the detection of a leg. If the worker sits transversely to the direction of travel, it must be ensured that both legs are in the vehicle. If the worker is standing, it must also be ensured that both legs are in the vehicle.

A switch from manual normal operation into the automatic mode with a person in the operator's cab is triggered by the person himself.

A switchover into the operating mode of emergency operation can be as follows:

One of the following conditions (or optionally further conditions) is satisfied and the vehicle is not in manual emergency operation.
  i. The middle protected field is interrupted, independently of whether the first protected field or the second protected field has been interrupted.
  ii. The first protected field is interrupted, the second protected field is free. The status of the third protected field is irrelevant here.
  iii. The second protected field is interrupted, the first protected field is free. The status of the third protected field is irrelevant here.

There can be even further reasons why the vehicle or the industrial truck is in the operating mode of emergency mode. For example, because the vehicle is in a certain zone or because, for example, particularly hazardous actions are carried out, e.g. a particularly high load is transported on the vehicle or industrial truck.

A switchover into the operating mode of partially automatic operation can take place under the following conditions:

A person is in contact with the vehicle, but the person is not in the operator's cab. All the protected fields of the sensor are thus free. The vehicle is manually controlled by the person.

A switchover into the operating mode of automatic mode without a person in the operator's cab can take place under the following conditions:

No person is detected in a protected field. All the protected fields are therefore free.

A switchover into the operating mode of automatic mode with a person in the operator's cab can take place under the following conditions:

The person is legitimately in the operator's cab. The first protected field and the second protected field are interrupted, that is a respective leg is validly detected and the third middle protected field is free.

There can be further conditions that have to be satisfied before the vehicle or the industrial truck can switch into the operating mode of manual normal operation, operating mode of partially automatic, or the operating mode automatic mode. Provision can, for example, be made that the person additionally has to have both hands at a defined position, e.g. at the steering wheel of the vehicle, in the operating mode of manual normal operation.

A logic link of the protected fields and a switchover between the operating modes of the vehicle can be carried out in the control and evaluation unit or in a safety controller. The control and evaluation unit can be accommodated in a housing together with the sensor. For this purpose, the control and evaluation unit has additional inputs, for example, to accept input signals of a manual control, for example. For this purpose, further signals optionally have to be safely transmitted to the sensor head (e.g. signals from a manual control).

Time conditions and instructions to the person can be provided.

Provision can be made that, instead of a purely digital switchover between the operating modes, the protected fields have to be interrupted or free for a certain time before the control and evaluation unit switches between the operating modes.

Provision can additionally be made that the person receives an indication before or after the control and evaluation unit switches the operating mode. The indications can, for example, be acoustic, optical, and/or mechanical, for example a vibration.

A forwarding of information to a higher instance can be provided. A time and/or an operating duration of the vehicle is, for example, communicated and the reasons for a switchover of the operating modes are communicated to a superior server control for evaluation. In this respect, a digital twin can also be provided that is implemented on a server plane.

A background evaluation can be provided by the control and evaluation unit.

Objects that are permanently present in the field of view or in the monitored zone of the sensor are read at certain time intervals and are compared with reference values and/or with a reference contour to increase the functional safety and to correct drift effects.

Provision can be made that the objects are detected for a minimum duration in the protected fields to avoid sporadic or brief non-critical interruptions of the protected fields.

The protected fields should moreover have a certain distance from possible interfering objects. Doors of the operator's cab should, for example, not project into the protected fields or be able to be masked. In this respect, the protected fields can also be arranged as inclined. The protected fields, for example, extend from the front side from above in the direction toward a rear side downwardly of the operator's cab. A seat of the operator's cab can here be taught as a background, for example.

The invention will also be explained in the following with respect to further advantages and features with reference to the enclosed drawing and embodiments. The Figures of the drawing show in:

FIGS. 1 to 7 in each case a system having a sensor.

In the following Figures, identical parts are provided with identical reference numerals.

FIG. 1a shows a system 1 having a sensor 2 for detecting legs 3 of a person 4 in a monitored zone 5 having at least one protected field 6 and for releasing a function of a vehicle 7, having a control and evaluation unit 8 for evaluating the protected field 6, wherein the sensor 2 is configured to generate at least one protected field 6, 6.1, wherein a first protected field 6.1 detects at least a part of a first leg 3.1 of the person 4, wherein the first protected field 6.1 detects at least a part of a second leg 3.2 of the person 4, the control and evaluation unit 8 is configured to determine whether at least a part of a first leg 3.1 of the person 4 was detected in the first protected field 6.1 and at least a part of a second leg 3.2 of the person 4 was detected in the first protected field 6.1, and to transmit at least a release signal to the vehicle 7 and thus to release the function when at least a part of a first leg 3.1 of the person 4 was detected in the first protected field 6.1 and at least a part of a second leg 3.2 of the person 4 was detected in the first protected field 6.1, wherein the sensor 2 is a time of flight sensor 9, wherein at least one light transmitter 10 transmits a light signal and at least one light receiver 11 receives a signal reflected or remitted by the person 4 and the control and evaluation unit 8 is configured to evaluate the received signal on the basis of the time of flight and to form object determination signals.

Figure 1B:
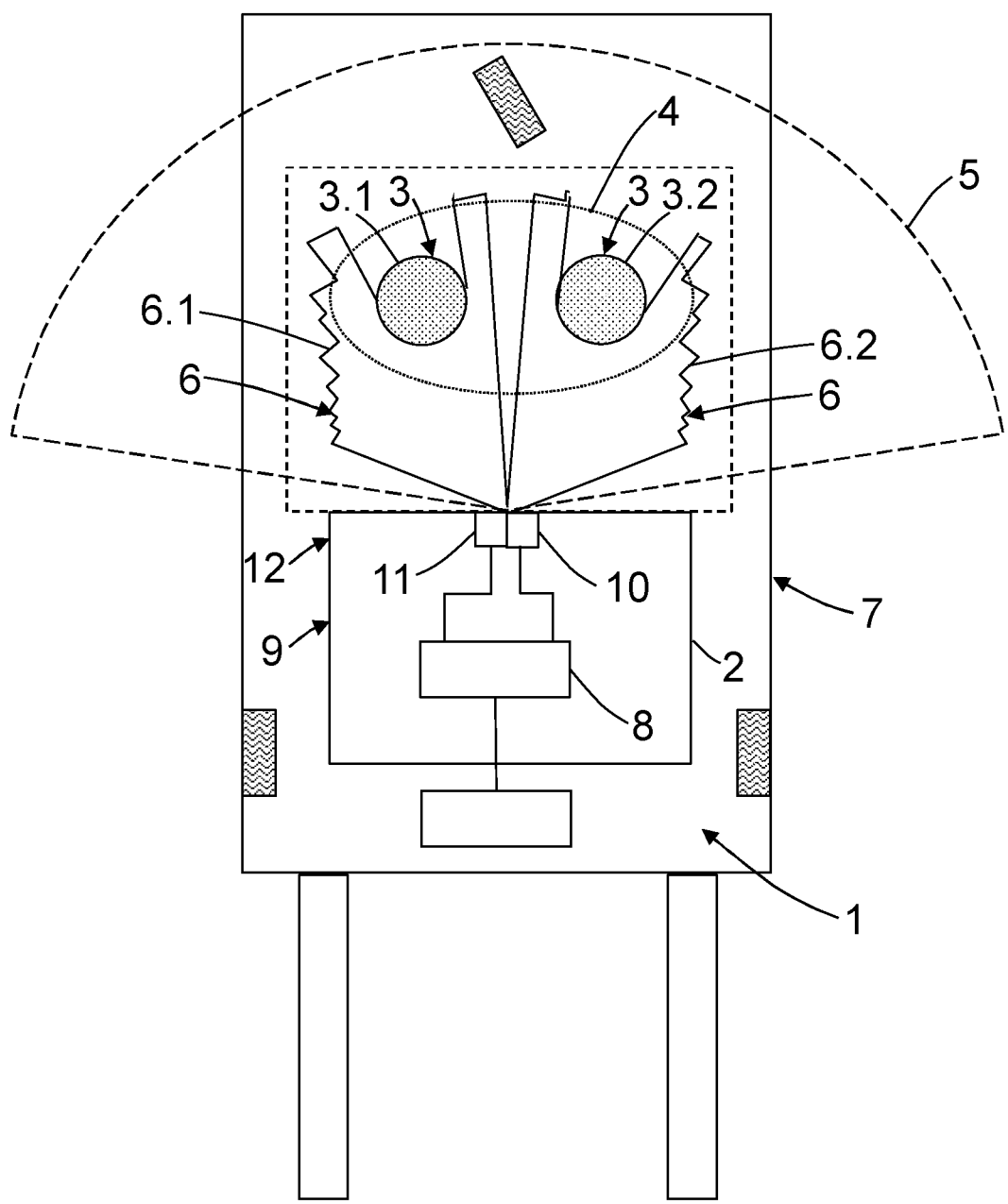

FIG. 1b shows a system 1 having a sensor 2 for detecting legs 3 of a person 4 in a monitored zone 5 having protected fields 6 and for releasing a function of a vehicle 7, having a control and evaluation unit 8 for evaluating the protected fields 6, wherein the sensor 2 is configured to generate at least two protected fields 6, wherein a first protected field 6.1 detects at least a part of a first leg 3.1 of the person 4, wherein a second protected field 6.2 detects at least a part of a second leg 3.2 of the person 4, the control and evaluation unit 8 is configured to determine whether at least a part of a first leg 3.1 of the person 4 was detected in the first protected field 6.1 and at least a part of a second leg 3.2 of the person 4 was detected in the second protected field 6.2, and to transmit at least a release signal to the vehicle 7 and thus to release the function when at least a part of a first leg 3.1 of the person 4 was detected in the first protected field 6.1 and at least a part of a second leg 3.2 of the person 4 was detected in the second protected field 6.2, wherein the sensor 2 is a time of flight sensor 9, wherein at least one light transmitter 10 transmits a light signal and at least one light receiver 11 receives a signal reflected or remitted by the person 4 and the control and evaluation unit 8 is configured to evaluate the received signal on the basis of the time of flight and to form object determination signals.

A scanning of the legs of the person 4 takes place by the time of flight sensor 9. A distance measurement with respect to the legs 3 thus takes place. The location or position of the legs 3 can additionally be determined via the distance measurement.

The protected fields 6 are here preferably aligned horizontally so that the leg is detected in cross-section. However, the protected fields 6 can also be inclined so that a cross-section of the legs 3 will always still be detected.

The first protected field 6.1, for example, detects the right leg of the person 4 and the second protected field detects the left leg of the person 4. The converse case transmission can, however, also be provided.

For example, it is measured by the sensor 2 and it is evaluated by the control and evaluation unit 8 whether a sufficiently wide object is present in the first protected field 6.1 and in the second protected field 6.2 respectively. The first protected field 6.1 and the second protected field 6.2 are so close to one another, for example, that a leg can 3 also be detected simultaneously in both protected fields 6. However, it is also simultaneously recognized that it is actually only a single leg 3 that is detected in both protected fields 6 respectively.

The first protected field 6.1 and the second protected field 6.2 are preferably arranged disjunctively so that they do not have any overlap. Provision can, however, also be made that the first protected field 6.1 and the second protected field 6.2 are arranged in an overlapping manner.

Provision can thus also be made on an overlapping arrangement that a single leg 3 is detected by the first protected field 6.1 and the second protected field 6.2.

Figure 2A:
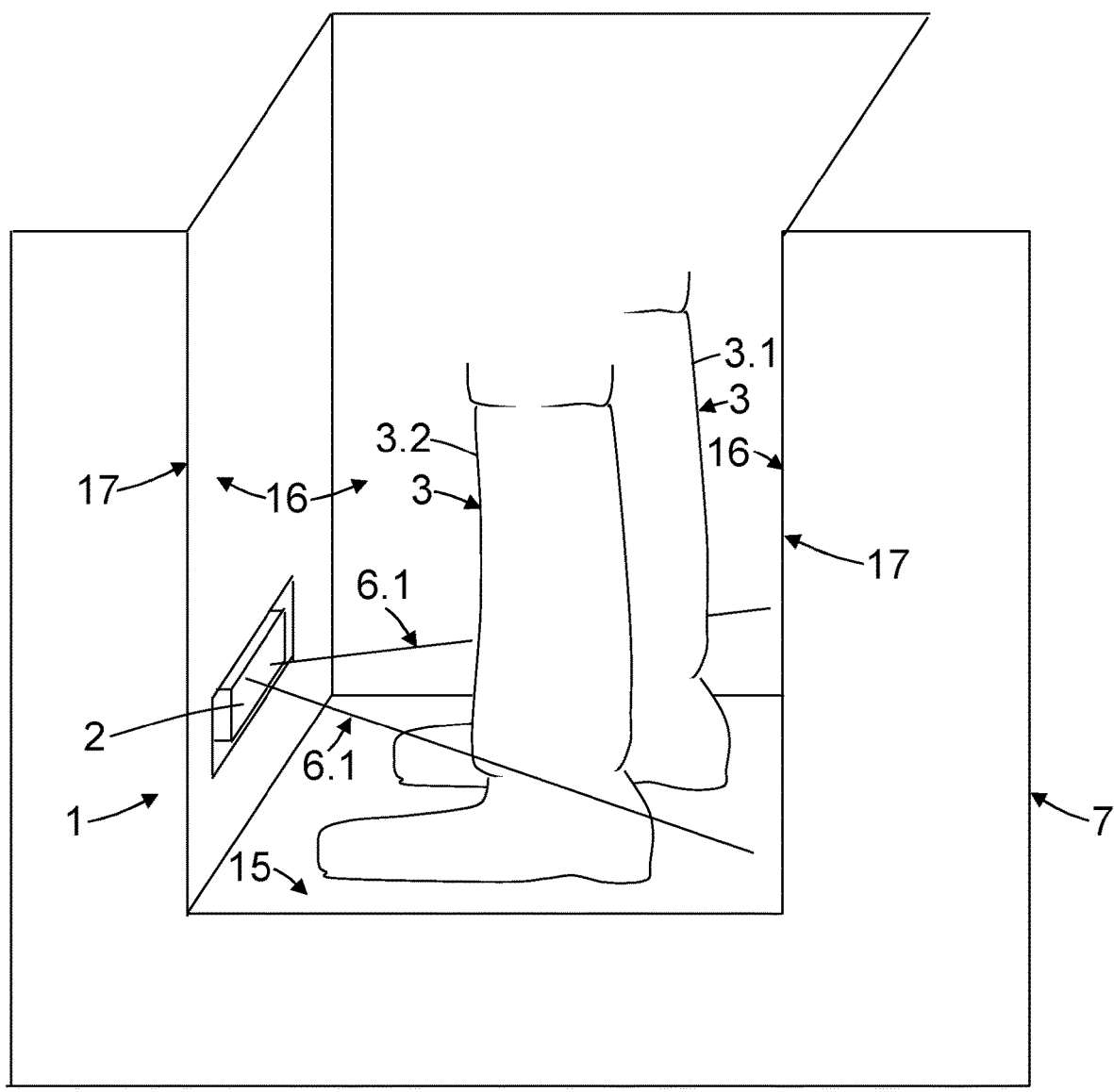

FIG. 2*a* shows a vehicle 7 having an operator's cab 17 and having the sensor 2 in accordance with FIG. 1*a* in a perspective view.

Figure 2B:
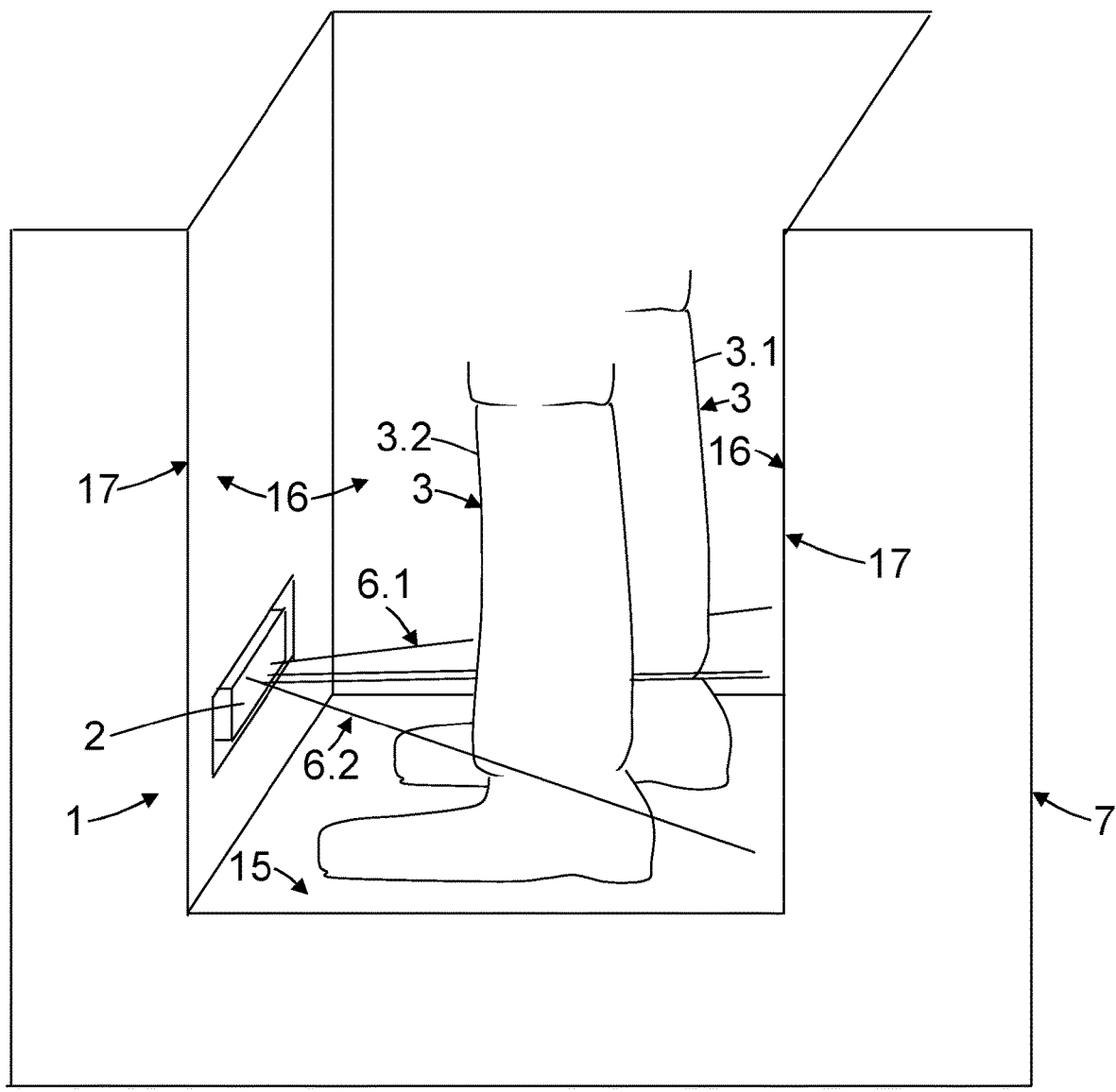

FIG. 2*b* shows a vehicle 7 having an operator's cab 17 and having the sensor 2 in accordance with FIG. 1*b* in a perspective view.

The first protected field 6.1 and the second protected field 6.2 are dimensioned as so large that at least one of the protected fields detects a leg 3 when the foot of the leg 3 is on the floor 15 of the operator's cab 17. This means that there are no all too large margins to side walls to a front wall, or to a rear wall of the operator's cab. The protected fields 6 admittedly have a distance from the front, rear, and/or side walls of the operator's cab, for example, but the distance from the adjacent walls is small enough that the leg 3 is also at the margin of the operator's cab and is thus still detected.

Provision can, however, also be made that the front, rear, and/or side walls are also covered by the protected fields 6. The front, rear, and/or side walls are thus equally constantly detected and can thus serve the validation of even the technical safety reference measurement so that the protected fields 6 are cyclically testable. The contour of the front, rear, and/or side walls serves as the reference contour here.

The sensor 2 is here preferably integrated in one of the front, rear, or side walls so that the sensor 2 does not, for example, project out of the wall. The footwell of the operator's cab is thereby not impaired by the sensor 2. The sensor 2 here preferably has a sufficient distance from the floor of the operator's cab so that preferably only the leg is detected and not the feet with the shoes. The distance of the protected fields from the floor is preferably between 100 mm and 300 mm.

In accordance with FIGS. 2*a* and 2*b*, the sensor 2 is integrated at a front inner side. The legs 3 of the person 4 are thereby detected from the front.

The sensor 2 can, for example, also be installed or arranged so low that the sensor 2 can safely detect the shoes, that is the feet, of the person. A greater minimal diameter or length and width of the lower extremity or of the lower leg can then also be assumed.

This is advantageous, on the one hand, since then a greater distance can be left from the rear wall by the protected field 6. The distance between the first protected field 6.1 and the second protected field 6.2 can also be larger.

The protected fields 6 are defined such that there is a zone in which the worker can be and each leg 3 only respectively actuates or interrupts the first protected field 6.1 or the second protected field 6.2.

The protected fields 6 can, for example, have any desired shapes or can be configured with any desired shapes. For example, parts of the protected fields 6 can have straight, curved, circular, and/or elliptical shapes. The shape of the protected fields 6 is only limited by the angular and distance resolution of the sensor 2.

The vehicle 7 can, for example, be a manual, semi-autonomous, or also autonomous vehicle. The vehicle 7 can in particular be a vehicle 7 that enables a manual, semi-autonomous, or autonomous mode of operation. The vehicle 7 can, for example, be a forklift truck, an industrial truck, or similar.

Figure 3:
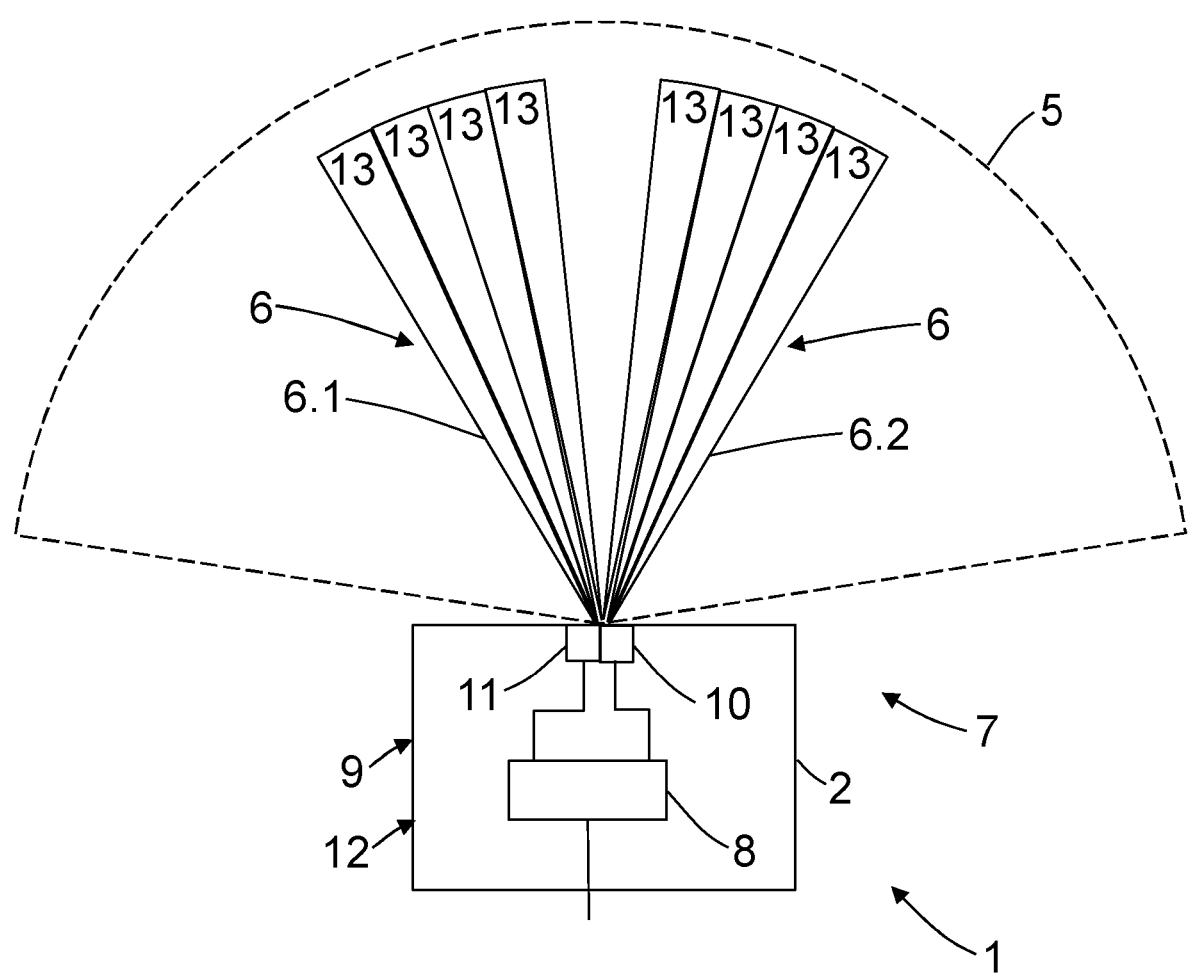

In accordance with FIG. 3, for example, a plurality of light transmitters 10 and a plurality of light receivers 11 are arranged, with the light transmitters 10 and the light receivers 11 being arranged in a common housing 12, with the light beams being transmitted by the light transmitters 10 in fan shape in different angular directions and being received by the light receivers 11, with a partial protected field 13 in the shape of a segment of a circle being formed by the light beams of a light transmitter 10 and a reception field of view of the light receiver 11, with the partial protected fields 13 of neighboring reception elements being adjacent to one another or overlapping and a plurality of partial protected fields 13 forming a protected field 6.

The measurement of the width of the leg 3 takes place, for example, such that the control and evaluation unit 8 counts how many neighboring partial protected fields 13 or partial beams have been interrupted.

Figure 4:
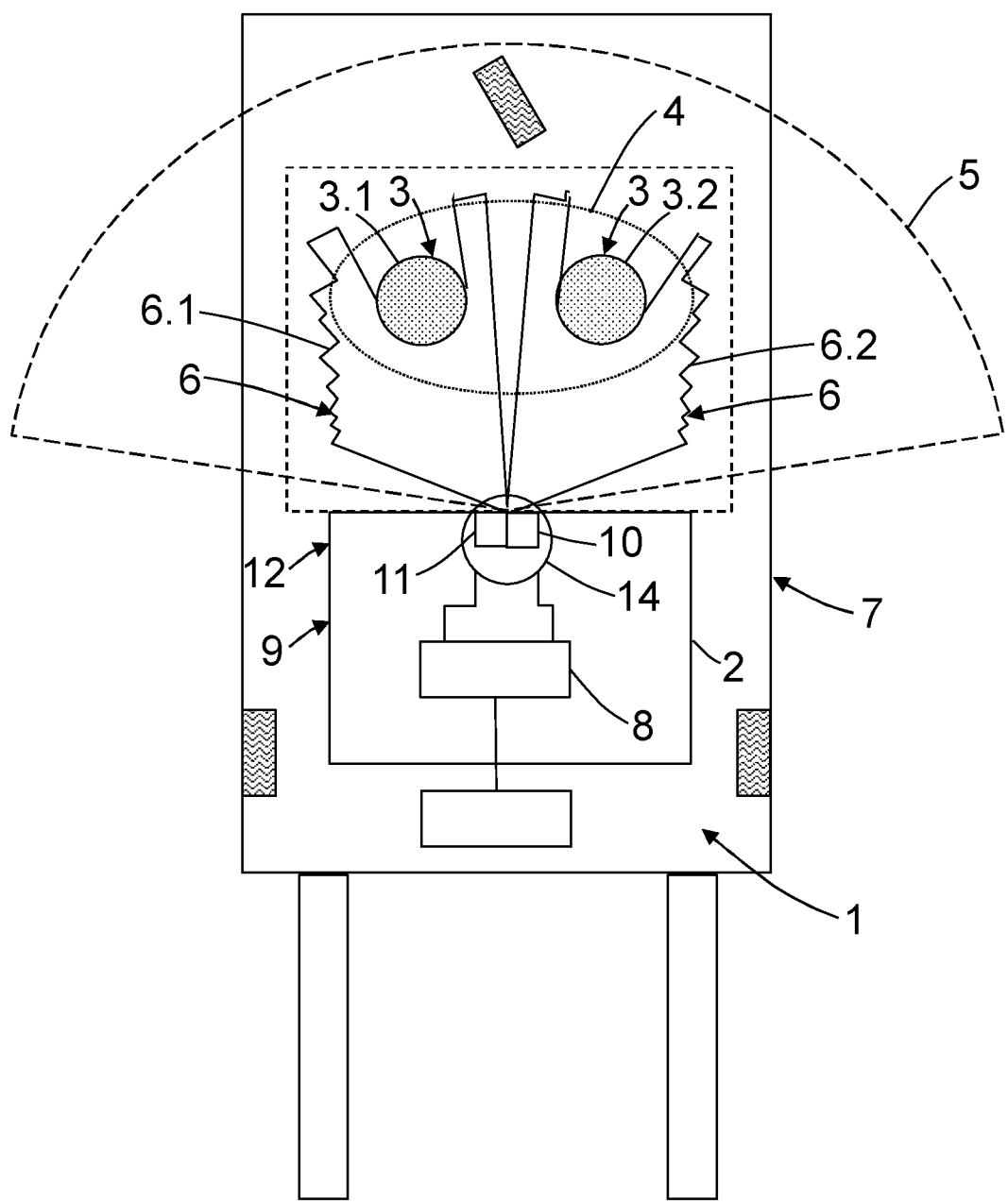

In an alternative embodiment in accordance with FIG. 4, the sensor 2 has a scanning unit 14 that is rotatable about an axis of rotation and that has at least one scanning module for the scanning of the monitored zone 5 in the course of the rotation of the scanning unit 14 about the axis of rotation and for the generation of corresponding received signals and that has the control and evaluation unit 8 for the acquisition of information on the objects from the received signals, with the scanning module comprising at least the light transmitter 10 for the transmission of a light beam or of a plurality of mutually separate light beams, and that has at least the light receiver 11 for the generation of the received signals from the light beams remitted by the objects.

In this respect, only a single light transmitter 10 and only a single light receiver 11 is required to generate the planar protected fields 6 since the light transmitter 10 and the light receiver 11 continuously detect the environment at different angles via the rotatable scanning unit 14

The protected field 6, for example. forms at least one segment of a circle of at least 5°, at least 10°, or at least 20°.

For example, the first protected field 6.1 and the second protected field 6.2 are arranged in a common plane. Both legs 3 are scanned at an equally high distance here. In this respect, the same size of the legs 3 can be assumed.

Figure 5:
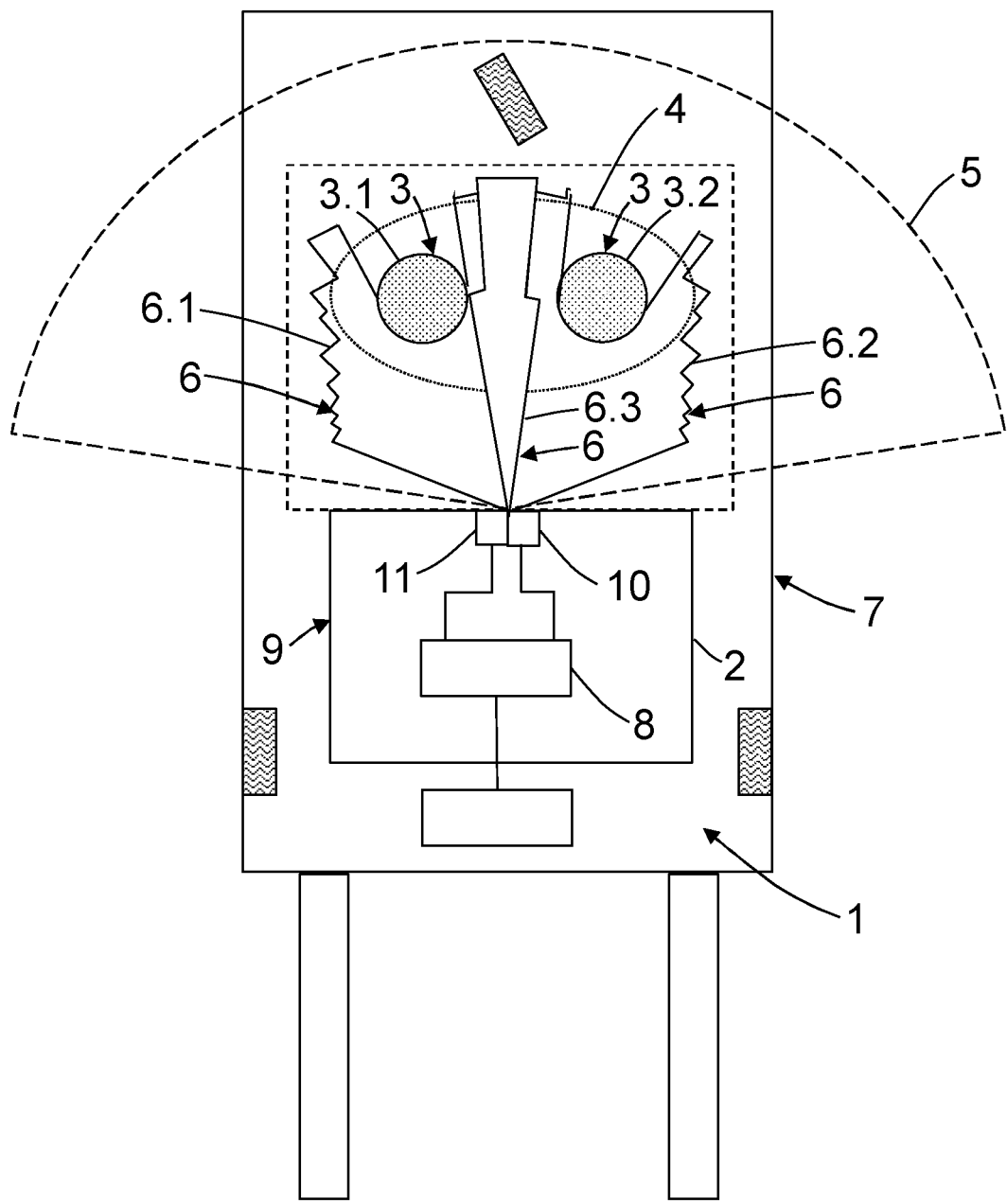

In accordance with FIG. 5, a third protected field 6.3 is arranged between the first protected field 6.1 and the second protected field 6.2.

The third protected field 6.3 is thus located at the center between the first protected field 6.1 and the second protected field 6.2. The third protected field 6.3 is here preferably arranged in a common plane with the first protected field 6.1 and the second protected field 6.2. The third protected field 6.3 is preferably as wide as the spacing between the first protected field 6.1 and the second protected field 6.2. The protected fields 6 can here be arranged spaced apart from one another or can also have overlap zones.

Provision is made here that a respective leg 3 of a person 4 is detected in the first protected field 6.1 and the second protected field 6.2 and no object or leg 3 is detected in the third protected field 6.3 The person 4 is then legitimately in the operator's cab and a release signal is generated by the control and evaluation unit 8 and is transmitted to the vehicle 7 or to the vehicle controller.

If a leg is 3 detected in the third protected field 6.3, no release signal is generated by the control and evaluation unit 8 and a movement of the vehicle 7 is prevented.

For example, the margins of the protected fields 6 have a distance from a wall of an operator's cab, with the distance being smaller than 50 mm.

This means that there are no all too large margins to side walls to a front wall, or to a rear wall of the operator's cab. The protected fields 6 admittedly have a distance from the front, rear, and/or side walls of the operator's cab, for example, but the distance from the adjacent walls is small enough that the leg 3 is also at the margin of the operator's cab and is thus still detected.

For example, the distance from the first protected field 6.1 and the second protected field 6.2 is smaller than 50 mm.

In accordance with the further development, the first protected field 6.1 and the second protected field 6.2 are spaced apart so far that only a respective one of the protected fields 6 can be interrupted by a single leg 3. Two legs 3 are thus effectively recognized when a respective one leg 3 is detected in a respective protected field 6.

For example, the control and evaluation unit 8 is configured to measure a permitted width of the leg 3 in the first protected field 6.1 and in the second protected field 6.2.

It is, for example, possible by the evaluation of the protected fields 6 to determine the width of the objects in the protected field 6 and to thereby detect the width of the leg 3 or of the lower leg below the knee. If the detected width of the object corresponds to an average width of a leg 3, it can be assumed that a leg 3 was detected. Permitted minimal values and permitted maximum values are expediently defined here.

Figure 6:
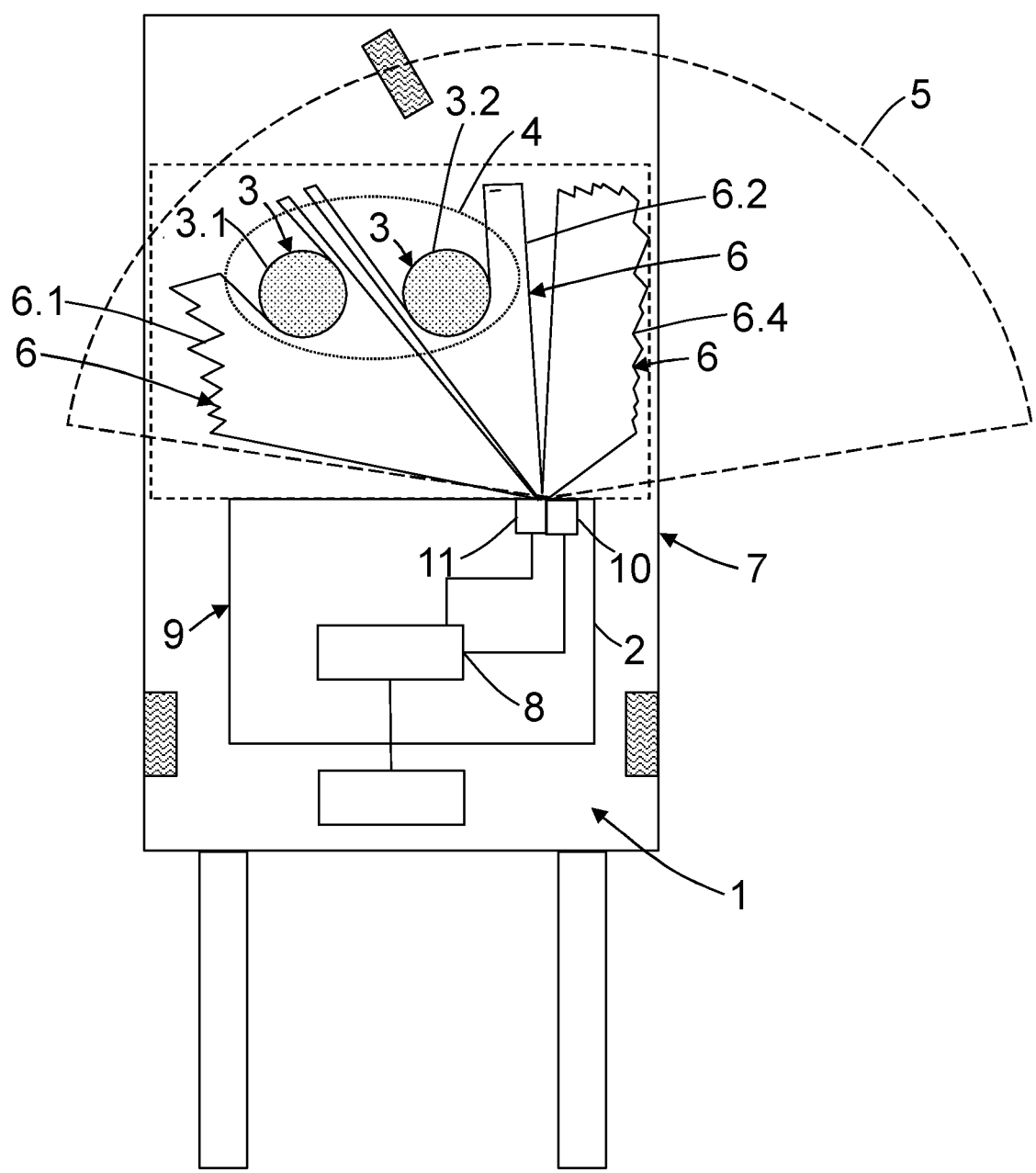

In accordance with FIG. 6, a further protected field 6.4 is arranged next to the first protected field 6.1 or next to the second protected field 6.2, with the further protected field 6.4 not being arranged between the first protected field 6.1 and the second protected field 6.2

The senso 2 here is, for example, not installed centrally in a side wall, namely, for example, installed in the direction of the entrance of the operator's cab. The further protected field 6.4 can here register an entry or alighting of the person 4 as a virtual door. The further protected field 6.4 is not actuated or is free if the person 4 is in the intended position in the operator's cab.

Figure 7:
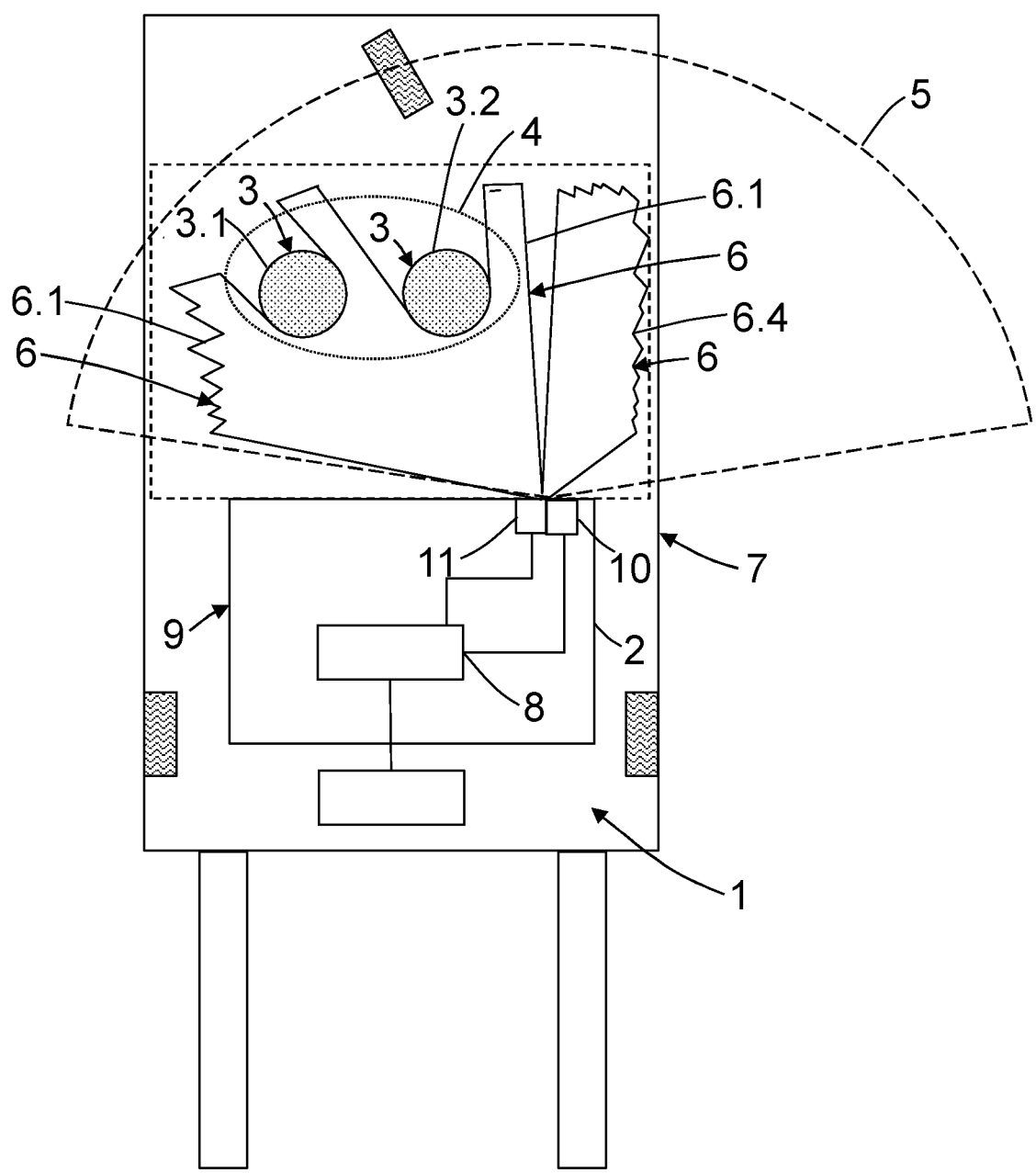

FIG. 7 shows a system 1 having a sensor 2 for detecting legs 3 of a person 4 in a monitored zone 5 having at least one protected field 6 and for releasing a function of a vehicle 7, having a control and evaluation unit 8 for evaluating the protected field 6, wherein the sensor 2 is configured to generate at least one protected field 6, 6.1, wherein a first protected field 6.1 detects at least a part of a first leg 3.1 of the person 4, wherein the first protected field 6.1 detects at least a part of a second leg 3.2 of the person 4, the control and evaluation unit 8 is configured to determine whether at least a part of a first leg 3.1 of the person 4 was detected in the first protected field 6.1 and at least a part of a second leg 3.2 of the person 4 was detected in the first protected field 6.2, and to transmit at least a release signal to the vehicle 7 and thus to release the function when at least a part of a first leg 3.1 of the person 4 was detected in the first protected field 6.1 and at least a part of a second leg 3.2 of the person 4 was detected in the first protected field 6.1, wherein the sensor 2 is a time of flight sensor 9, wherein at least one light transmitter 10 transmits a light signal and at least one light receiver 11 receives a signal reflected or remitted by the person 4 and the control and evaluation unit 8 is configured to evaluate the received signal on the basis of the time of flight and to form object determination signals.

In accordance with FIG. 7, a further protected field 6.4 is arranged next to the first protected field 6.1.

The sensor 2 here is, for example, not installed centrally in a side wall, namely, for example, installed in the direction of the entrance of the operator's cab. The further protected field 6.4 can here register an entry or alighting of the person 4 as a virtual door. The further protected field 6.4 is not actuated or is free if the person 4 is in the intended position in the operator's cab.

In accordance with FIG. 4 or FIG. 5, a leg position or a leg movement is detected, for example, in at least one protected field 6 and a braking procedure of the vehicle 7 is controllable by the control and evaluation unit 8 starting from the leg position or leg movement.

A braking procedure can thereby be controlled in dependence on the detected distance from a leg 3. A virtual brake pedal is thus formed. The closer the leg 3 is therefore moved to the front, for example, the greater the braking. If the leg 3 is moved to the rear, the brake is released again. The contactless brake can be implemented by means of the first protected field 6.1 or by means of the second protected field 6.2.

The distance or the angle, or a combination of both, could be evaluated in the protected field 6 to control the braking procedure. The brake can, for example, also be controlled by a lateral movement of the leg 3.

The braking procedure can in particular be controlled by a lateral leg movement in the direction of the third protected field 6.3

A detection of the leg 3 in the third protected field 6.3 can here, for example, trigger a more powerful braking or a full braking or an emergency stop.

For this purpose, for example, further protected fields 6 or braking fields can also be defined to provide a more comfortable braking function.

These protected fields 6 could be used to brake the vehicle, optionally with an evaluation, that brakes more and more the closer leg approaches the third protected field 6.3 or with the greatest braking when the leg 3 is detected in the third protected field 6.3.

The vehicle 7, formed by a vehicle controller, can have different operating modes.

A manual normal operation is, for example, provided as an operating mode of the vehicle 7 or of the vehicle controller. All the functions of the vehicle 7 are switched free here. The person controls the vehicle 7.

An emergency operation is furthermore provided as an operating mode of the vehicle 7, for example. The vehicle 7 switches into this operating mode when a fault has occurred.

An automatic mode and a semi-automatic mode can furthermore be provided as an operating mode of the vehicle 7.

REFERENCE NUMERALS 1 system
2 sensor
3 legs
3.1 first leg
3.2 second leg
4 person
5 monitored zone
6 protected field
6.1 first protected field
6.2 second protected field
6.3 third protected field
6.4 further protected field
7 vehicle
8 control and evaluation unit
9 time of flight sensor
10 light transmitter
11 light receiver
12 housing
13 partial protected field
14 scanning unit
15 floor
16 margins
17 operator's cab

The invention claimed is:

1. A system having a sensor for detecting legs of a person in a monitored zone having at least one protected field and for releasing a function of a vehicle,
having a control and evaluation unit for evaluating the protected field,
wherein the sensor is configured to generate at least one protected field, with a first protected field detecting at least a part of a first leg of the person,
wherein the first protected field detects at least a part of a second leg of the person,
the control and evaluation unit is configured to determine whether
at least the part of the first leg of the person was detected in the first protected field
and at least the part of the second leg of the person was detected in the first protected field,
and to transmit at least a release signal to the vehicle and thus to release the function when
at least the part of the first leg of the person was detected in the first protected field
and at least the part of the second leg of the person was detected in the first protected field,
wherein the sensor is a time of flight sensor,
with at least one light transmitter transmitting a light signal,
and at least one light receiver receiving a signal reflected or remitted by the person,
and the control and evaluation unit is configured to evaluate the received signal on the basis of the time of flight and to form object determination signals,
wherein a front, rear, and/or side wall of at least one protected field is also covered, with the front, rear, and/or side walls serving as a reference contour.

2. The system in accordance with claim 1, wherein the sensor is integrated in a front, rear, or side wall so that the sensor does not project out of the wall.

3. The system in accordance with claim 1, wherein a plurality of light transmitters and a plurality of light receivers are arranged, with the light transmitters and the light receivers being arranged in a common housing, with the light beams being transmitted by the light transmitters in fan shape in different angular directions and being received by the light receivers,
with a partial protected field in the shape of a segment of a circle being formed by the light beams of a light transmitter and a reception field of view of the light receiver,
with the partial protected fields of neighboring light receivers being adjacent to or overlapping one another and forming a plurality of partial protected fields.

4. The system in accordance with claim 1, wherein the sensor has a scanning unit that is rotatable about an axis of rotation and that has at least one scanning module for scanning the monitored zone in the course of the rotation of the scanning unit about the axis of rotation and for generating corresponding received signals, and having the control and evaluation unit for the acquisition of information on the persons from the received signals, with the scanning module comprising at least the light transmitter for transmitting a light beam or a plurality of light beams separately from one another and at least the light receiver for generating the received signals from the light beams remitted by the person.

5. The system in accordance with claim 1, wherein the protected field forms a segment of a circle of at least 5°, at least 10°, or at least 20°.

6. The system in accordance with claim 1, wherein a further protected field is arranged next to the first protected field.

7. The system in accordance with claim 1, wherein a further protected field is arranged next to the first protected field or next to the second protected field, with the further protected field not being arranged between the first protected field and the second protected field.

8. The system in accordance with claim 1, wherein the margins of the protected fields have a distance from a wall of an operator's cab, with the distance being smaller than 50 mm.

9. The system in accordance with claim 1, wherein the distance from the first protected field and the second protected field is smaller than 50 mm.

10. The system in accordance with claim 1, wherein the control and evaluation unit is configured to measure a permitted width of the leg in the first protected field and in the second protected field.

11. The system in accordance with claim 1, wherein a leg position or a leg movement is detected in at least one protected field and a braking procedure of the vehicle is controllable by the control and evaluation unit starting from the leg position or leg movement.

12. The system in accordance with claim 1, wherein the sensor transmits a plurality of different signals to the vehicle.

13. A system having a sensor for detecting legs of a person in a monitored zone having protected fields and for releasing a function of a vehicle,
    having a control and evaluation unit for evaluating the protected fields,
    wherein the sensor is configured to generate at least two protected fields, with a first protected field detecting at least a part of a first leg of the person,
    wherein a second protected field detects at least a part of a second leg of the person;
    in that the control and evaluation unit is configured, to determine whether
    at least the part of the first leg of the person was detected in the first protected field
    and at least the part of the second leg of the person was detected in the second protected field,
    and to transmit at least a release signal to the vehicle and thus to release the function when
    at least the part of the first leg of the person was detected in the first protected field
    and at least the part of the second leg of the person was detected in the second protected field,
    wherein the sensor is a time of flight sensor,
    with at least one light transmitter transmitting a light signal,
    and at least one light receiver receiving a signal reflected or remitted by the person,
    and the control and evaluation unit is configured to evaluate the received signal on the basis of the time of flight and to form object determination signals,
    wherein a front, rear, and/or side wall of at least one protected field is also covered, with the front, rear, and/or side walls serving as a reference contour.

14. The system in accordance with claim 13, wherein the sensor is integrated in a front, rear, or side wall so that the sensor does not project out of the wall.

15. The system in accordance with claim 13, wherein a plurality of light transmitters and a plurality of light receivers are arranged, with the light transmitters and the light receivers being arranged in a common housing, with the light beams being transmitted by the light transmitters in fan shape in different angular directions and being received by the light receivers,
    with a partial protected field in the shape of a segment of a circle being formed by the light beams of a light transmitter and a reception field of view of the light receiver,
    with the partial protected fields of neighboring light receivers being adjacent to or overlapping one another and forming a plurality of partial protected fields.

16. The system in accordance with claim 13, wherein the sensor has a scanning unit that is rotatable about an axis of rotation and that has at least one scanning module for scanning the monitored zone in the course of the rotation of the scanning unit about the axis of rotation and for generating corresponding received signals, and having the control and evaluation unit for the acquisition of information on the persons from the received signals, with the scanning module comprising at least the light transmitter for transmitting a light beam or a plurality of light beams separately from one another and at least the light receiver for generating the received signals from the light beams remitted by the person.

17. The system in accordance with claim 13, wherein the protected field forms a segment of a circle of at least 5°, at least 10°, or at least 20°.

18. The system in accordance with claim 13, wherein the first protected field and the second protected field are arranged in a common plane.

19. The system in accordance with claim 13, wherein a third protected field is arranged between the first protected field and the second protected field.

20. The system in accordance with claim 13, wherein a further protected field is arranged next to the first protected field or next to the second protected field, with the further protected field not being arranged between the first protected field and the second protected field.

21. The system in accordance with claim 13, wherein the margins of the protected fields have a distance from a wall of an operator's cab, with the distance being smaller than 50 mm.

22. The system in accordance with claim 13, wherein the distance from the first protected field and the second protected field is smaller than 50 mm.

23. The system in accordance with claim 13, wherein the control and evaluation unit is configured to measure a permitted width of the leg in the first protected field and in the second protected field.

24. The system in accordance with claim 13, wherein a leg position or a leg movement is detected in at least one protected field and a braking procedure of the vehicle is controllable by the control and evaluation unit starting from the leg position or leg movement.

25. The system in accordance with claim 13, wherein the sensor transmits a plurality of different signals to the vehicle.

26. A method of detecting legs of a person in a monitored zone having a sensor having at least one protected field and for releasing a function of a vehicle,
    having a control and evaluation unit for evaluating the protected field,
    wherein the sensor is configured to generate at least one protected field, with a first protected field detecting at least a part of a first leg of the person,
    wherein the first protected field detects at least a part of a second leg of the person,
    the control and evaluation unit is programmed to determine whether
    at least the part of the first leg of the person was detected in the first protected field
    and at least the part of the second leg of the person was detected in the first protected field,
    and to transmit at least a release signal to the vehicle and thus to release the function when
    at least the part of the first leg of the person was detected in the first protected field
    and at least the part of the second leg of the person was detected in the first protected field,
    wherein the sensor is a time of flight sensor,
    with at least one light transmitter transmitting a light signal,
    and at least one light receiver receiving a signal reflected or remitted by the person;
    and in that the control and evaluation unit is configured to evaluate the received signal on the basis of the time of flight and to form object determination signals,
    wherein a front, rear, and/or side wall of at least one protected field is also covered, with the front, rear, and/or side walls serving as a reference contour.

27. A method of detecting legs of a person in a monitored zone having a sensor having protected fields and for releasing a function of a vehicle,
- having a control and evaluation unit for evaluating the protected fields,
- wherein the sensor is configured to generate at least two protected fields, with a first protected field detecting at least a part of a first leg of the person,
- wherein a second protected field detects at least a part of a second leg of the person,
- the control and evaluation unit is programmed to determine whether
- at least the part of the first leg of the person was detected in the first protected field
- and at least the part of the second leg of the person was detected in the second protected field,
- and to transmit at least a release signal to the vehicle and thus to release the function when
- at least the part of the first leg of the person was detected in the first protected field
- and at least the part of the second leg of the person was detected in the second protected field,
- wherein the sensor is a time of flight sensor,
- with at least one light transmitter transmitting a light signal,
- and at least one light receiver receiving a signal reflected or remitted by the person,
- and the control and evaluation unit is configured to evaluate the received signal on the basis of the time of flight and to form object determination signals,
- wherein a front, rear, and/or side wall of at least one protected field is also covered, with the front, rear, and/or side walls serving as a reference contour.

* * * * *